(12) United States Patent
Möller et al.

(10) Patent No.: US 7,334,552 B2
(45) Date of Patent: Feb. 26, 2008

(54) INTERNAL VISCOUS DAMPER MONITORING SYSTEM AND METHOD

(75) Inventors: Peter Möller, Mölndal (SE); Erik Svenske, Göteborg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 182 days.

(21) Appl. No.: 11/245,510

(22) Filed: Oct. 7, 2005

(65) Prior Publication Data
US 2007/0079785 A1 Apr. 12, 2007

(51) Int. Cl.
*F02B 75/06* (2006.01)
(52) U.S. Cl. .................................. 123/192.1
(58) Field of Classification Search ............. 123/192.1;
701/29; 74/604, 574.4; 73/11.05, 579
See application file for complete search history.

(56) References Cited

U.S. PATENT DOCUMENTS

| | | | |
|---|---|---|---|
| 4,008,600 A | 2/1977 | Bremer, Jr. et al. | |
| 5,213,186 A | 5/1993 | Murata | |
| 5,618,244 A | 4/1997 | Chung | |
| 5,747,678 A | 5/1998 | Angermaier | |
| 5,876,306 A | 3/1999 | Murata | |
| 7,171,292 B2 * | 1/2007 | Bellinger et al. | 701/29 |

* cited by examiner

*Primary Examiner*—Stephen K. Cronin
*Assistant Examiner*—Hyder Ali
(74) *Attorney, Agent, or Firm*—Allan J. Lippa; Alleman Hall McCoy Russell & Tuttle LLP

(57) ABSTRACT

A method for operating an internal combustion engine of a vehicle traveling on the road, the method comprising of damping engine vibration with a damper coupled to the engine, and when said damping is reduced, preventing engine speed from falling below a threshold value, at least under selected operating conditions, to reduce degradation of the engine that would otherwise occur.

20 Claims, 7 Drawing Sheets

INTERNAL VISCOUS DAMPER MONITORING SYSTEM AND METHOD

BACKGROUND

Engine combustion during vehicle operation may create vibration and/or oscillations that may be transmitted to the vehicle driver or that may cause degradation of other engine and/or vehicle components.

One approach to reduce such vibration, at least under some conditions, is to use a damper mounted to the crankshaft. In some cases, the damper may include a viscous fluid internal to the damper, along with an internal flywheel. Another type of damper can use elastomeric materials, such as described in U.S. Pat. No. 4,008,600. Such damper can then be tuned to reduce an amplitude of crankshaft fluctuations across a selected engine operating range.

The inventors herein have recognized that if degradation occurs to the damper (e.g., damping is reduced), then engine vibration may be increased beyond an acceptable level, causing customer dissatisfaction. Further, a reduction in damping may even cause engine or other component degradation. The inventors herein have also recognized that when using a viscous damper, degradation of the viscosity of the fluid may also cause a reduction in damping, and that such reduction may cause engine degradation.

SUMMARY

To address at least some of the above issues, in one example, a method is provided for operating an internal combustion engine of a vehicle traveling on the road. The method comprises damping engine vibration with a damper coupled to the engine; and when said damping is reduced, preventing engine speed from rising above a threshold valve, at least under selected operating conditions, to reduce degradation of the engine that would otherwise occur.

In this way, it is possible to take corrective action to prevent (or reduce the likelihood of) engine speed from falling into a resonance window in which un-damped engine vibration may cause degraded performance.

In one particular embodiment, the damper may be an internal viscous damper mounted on the engine crankshaft, where reduction in viscous damping is identified by monitoring an amplitude of engine speed fluctuations at selected harmonic orders of engine firing frequency. In this way, an accurate determination of the damping reduction can be provided.

In another embodiment, the method may include a discrete Fourier Transform to process engine speed oscillation data to identify vibration modes and changes in vibration amplitude at selected frequencies or engine speeds. Again, such operation can provide accurate determination of vibration damper degradation.

In still another embodiment, the method may include adjustment of throttle position and/or fuel injection amounts to maintain engine speed below the maximum value, where the maximum engine speed value decreases under degraded conditions.

Note that various types of dampers may be used other than, or in addition to, a viscous vibration damper. Further, additional actions, other than maintaining engine speed below a threshold value, may also be used, if desired.

DETAILED DESCRIPTION

Figure 1:
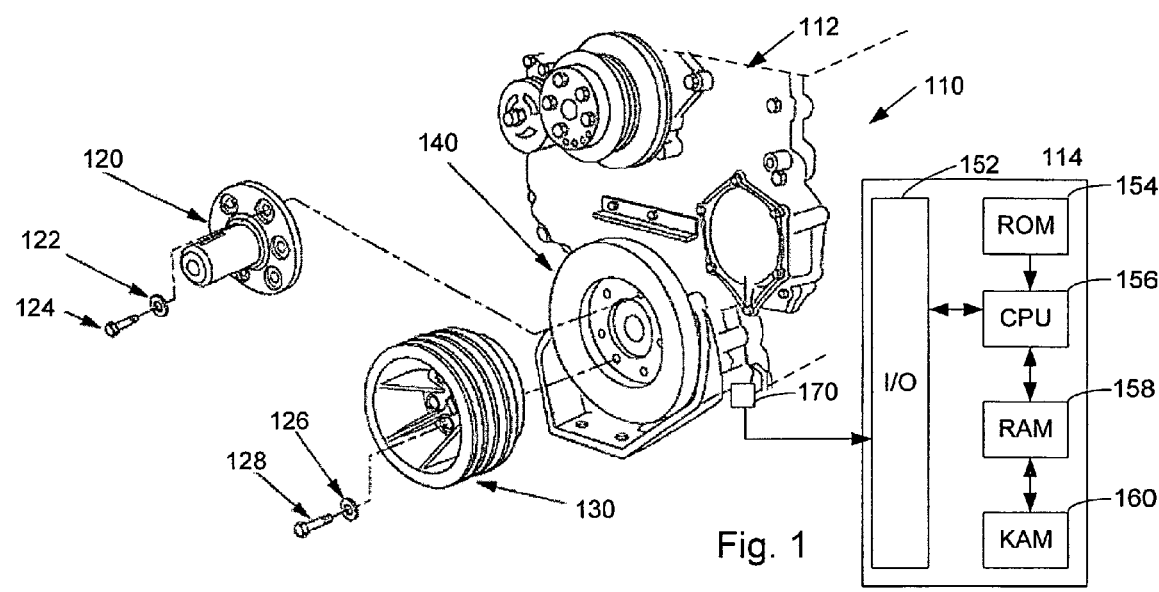
FIG. 1 shows an engine and damper assembly.

FIG. 1 shows engine 110, which may be a multi-cylinder engine having an intake and exhaust path (not shown). Engine 110 may be an engine of a passenger vehicle, transport truck, or other type of vehicle, for traveling on the road. Engine 110 may be a direct fuel injection engine or port fuel injection engine, and the fuel may be gasoline, diesel, alcohol, or combinations thereof, for example.

Continuing with FIG. 1, engine 110 may be controlled by electronic engine controller 114. The engine may have one or more combustion chambers with reciprocating pistons located therein. The pistons may be coupled to a crankshaft (see FIG. 2). The crankshaft may be coupled to various front end accessories via crankshaft pulley and hub assembly 130, which is coupled to the crankshaft via bolts and washers 128 and 126 located at the engine front end face 112. In this particular example, the crankshaft pulley and hub assembly 130 is coupled through a viscous vibration damper 140 to the crankshaft, which may be an internal viscous damper. In an alternative embodiment, a crankshaft pulley spindle 120 may be used in place of assembly 130, where again spindle 120 is coupled through viscous vibration damper 140 to the crankshaft via bolts and washers 124 and 122.

The viscous vibration damper 140 is thus mounted on the front end of the crankshaft to reduce torsional vibration, which may otherwise generate engine degradation, noise, and/or driver dissatisfaction. Details of an example damper are described in more detail below herein with regard to FIG. 2. Note, however, that various other dampers may be used, if desired.

Controller 114 is shown in FIG. 1 as a microcomputer, including microprocessor unit 156, input/output ports 152, an electronic storage medium for executable programs and calibration values shown as read only memory chip 154 in this particular example, random access memory 158, keep alive memory 160, and a data bus. Controller 114 is configured to receive various signals from sensors coupled to engine 110, including a signal indicative of engine position and/or engine speed from sensor 170. Sensor 170 may be referred to as a crankshaft position signal, and may be generated by a toothed wheel coupled to the crankshaft, for example. In addition, various other signals may be received by controller 114, including engine load, manifold pressure, throttle position, cam timing of a variable cam timing system, etc. Further, various actuators may be commanded by controller 114, including position of an electronically controlled throttle plate in the engine intake manifold, spark timing, fuel injection amounts, etc.

The crankshaft of engine 110 may be coupled to a transmission through at a rear end of the engine. The transmission may be a manual transmission or an automatic transmission with a torque converter. Further, a continuously variable transmission may also be used.

Figure 2:
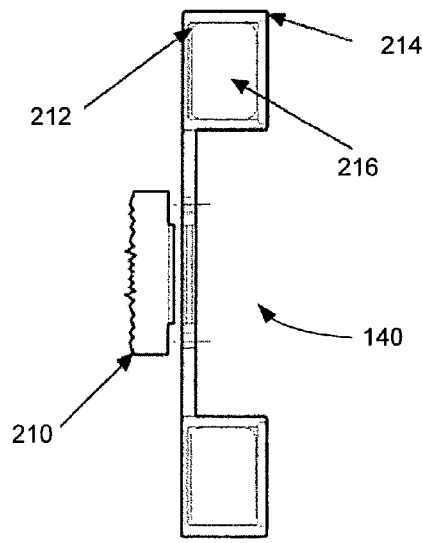
FIG. 2 shows an example viscous damper.

Referring now to FIG. 2, an example viscous damper is shown coupled to crankshaft 210. The damper 140 includes viscous fluid 212 contained in a sealed damper shell 214 surrounding an internal flywheel 216. The fluid may have various levels of viscosity, and the level of viscosity may be selected based on engine design, vehicle design, or combinations thereof. Further, the amount of fluid, and location/positioning of fluid in the damper may also be varied to affect vibration isolation performance.

During engine operation, the outer shell, which is firmly attached to the crankshaft, turns at the speed of the crankshaft. Motion of the crankshaft is thus transferred to the internal flywheel through the viscous fluid in the shell. This fluid coupling creates a dynamic system with internal damping to reduce speed fluctuations across a speed (or frequency) range.

As noted herein, under some conditions, the viscosity of the fluid may decrease over time due to various factors, such as temperature cycling, leakage, etc.

Figure 3:
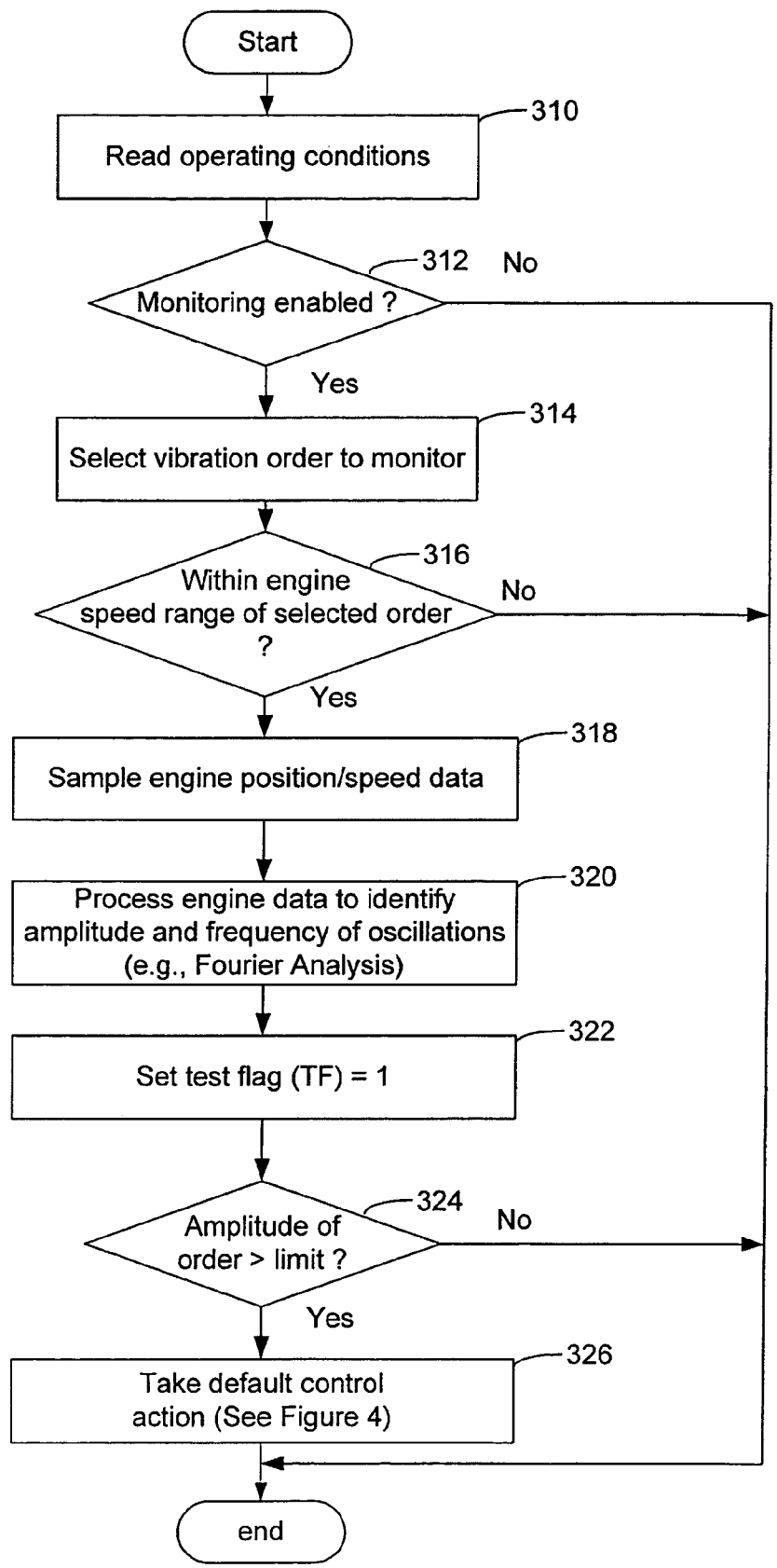
FIGS. 3-4 show example high level flowcharts for carrying example monitoring and default action routines.

Referring now to FIG. 3, a high level flowchart is shown describing an example routine for identifying whether degradation of a viscous damper has occurred, and taking default control action to adjust engine and/or vehicle operation to mitigate effects of such degradation. In this example, the routine monitors an amplitude (or amplitudes) of engine speed fluctuations (torsional oscillations) during selected engine speed ranges. However, the routine may also measure oscillation amplitude and frequency, or combinations thereof.

Referring now specifically to FIG. 3, in 310 the routine reads engine and/or vehicle operating conditions, such as time since engine start, engine coolant temperature, engine speed, engine load, gear ratio, torque converter clutch state, etc. Next, in 312, the routine determines whether monitoring of the viscous damper is enabled. Various conditions may be used to enable monitoring. For example, the routine may enable monitoring when the transmission is in neutral, a forward gear, or a reverse gear. The routine may also enable monitoring based on whether engine misfire detection has identified an engine misfire (in which case damper monitoring may be disabled), based on the engine warm-up conditions (in which case monitoring may be enabled after the engine has reached a selected operating temperature), whether a torque converter is locked (in which case monitoring may be enabled), engine load, or others. In the case of engine load, damper monitoring may be enabled when the engine load is greater than a threshold value.

Next, if monitoring is disabled, the routine proceeds to the end. Otherwise, the routine proceeds to 314 to select a vibration order to monitor. In one example, the routine selects a vibration order based on the engine firing frequency (or engine speed). For example, the routine may select a $1^{st}$ order, $2^{nd}$ order, $3^{rd}$ order, $4^{th}$ order, $5^{th}$ order, $6^{th}$ order, or other orders, or combinations of orders. The routine may select the order to monitor based on various conditions, such as engine load, transmission gear ratio, transmission state (e.g., neutral or engaged), torque converter lock-up state (e.g., locked, unlocked, or partially locked), vehicle speed, engine speed, others, or combinations thereof.

Once the order is selected, the routine proceeds to 316 to determine whether the engine is within a selected engine speed range for the selected order to perform the monitoring. If so, the routine proceeds to 318 to sample the engine position/speed data and process the data in 320. The routine may use various approaches to process the oscillation data and identify amplitude and/or frequency content. In one example, a Fourier Transform may be used, and in particular a discrete form of the transform may be used to facilitate on-board processing in controller 114. However, various other transforms, such as wavelet transforms, or other narrow band filtering (analog or digital) may be used, if desired.

Various example data sets and results are described in more detail herein with regard to FIGS. 5-8.

Once the routine has processed engine data to identify whether damper degradation may be present, the routine sets a flag (TF) to 1, indicating that a test has completed. Next, the routine determines in 324 whether the measured amplitude of oscillations of the monitored vibration order is greater than a limit value, thereby indicating degradation of the damper 140. In one example, a single limit value may be used, but in another example different limit values may be used for different conditions. For example, the limit value may be adjusted depending on the order being monitored, engine load, transmission gear and/or conditions, or others.

If such degradation is identified, the routine continues to 326 to take default action, which is described in more detail below with regard to FIG. 4. Otherwise, the routine ends. In this way, it is possible to monitor performance of viscous clutch coupled to an engine crankshaft during engine and/or vehicle operation, and identify degraded performance so that default action may be taken. Further, in one example, by using amplitude content of crankshaft oscillation at selected frequencies (or engine speeds), it is possible to provide an accurate estimate of a level of damping reduction (or viscosity reduction).

Figure 4:
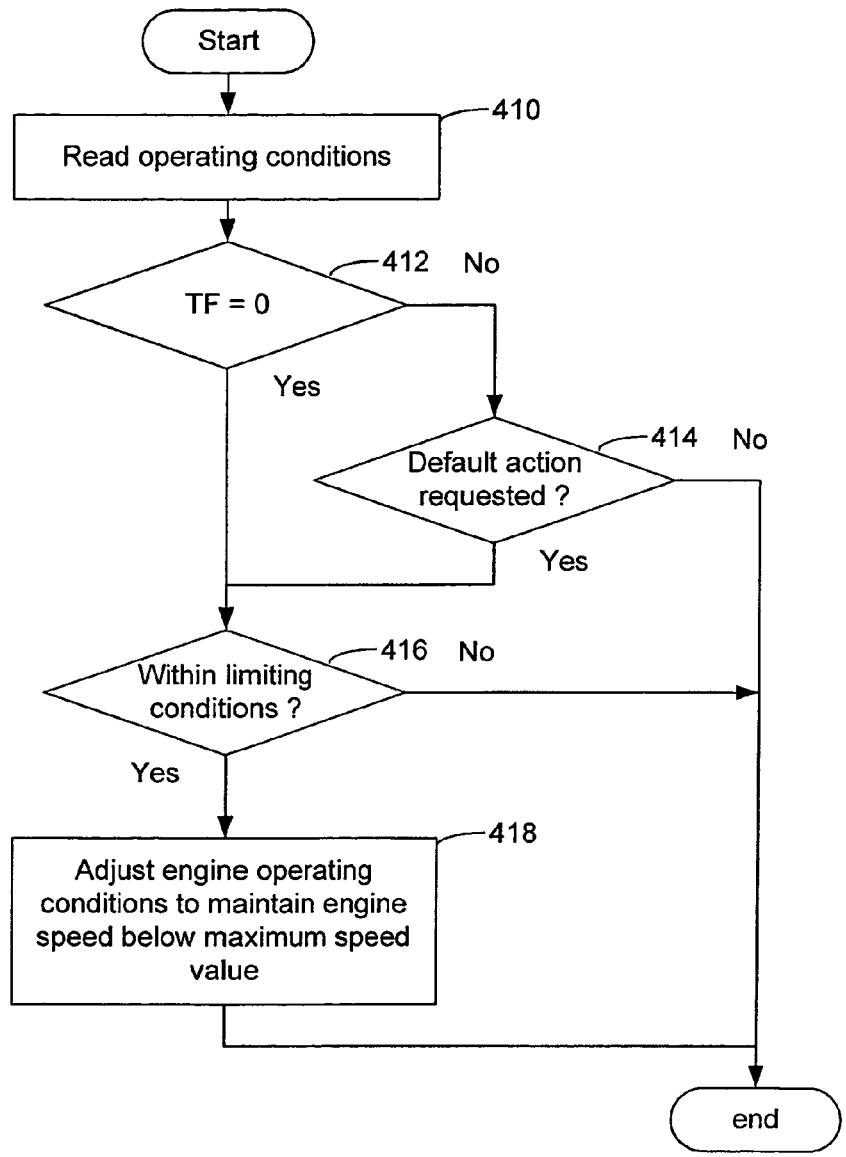

Referring now to FIG. 4, it describes a routine for taking default action when damper degradation is detected, or when damper monitoring has not yet been performed. In 410, the routine reads operating conditions, such as those listed above with regard to 310. Next, in 412, the routine determines whether the test flag (TF) is zero. If so, this indicates that the damper has not yet been tested (or is scheduled to be tested and such a test has not yet been completed). In this case, the routine continues to 416. Otherwise, the routine continues to 414 to determine whether default action has been request from the routine of FIG. 3. If so, the routine also continues to 416.

In 416, the routine determines whether conditions are present in which engine speed limiting (e.g., maintaining engine speed below a selected threshold, where the threshold varies with an amount of degradation of the damper) should be carried out to reduce an impact of operating with a potentially degraded damper. For example, the routine may perform engine speed limiting when the vehicle is in gear, or when the vehicle is moving. I.e., the engine speed may be allowed to rise above a threshold value even during damper degradation under selected conditions.

When the answer to 416 is yes, the routine continues to 418 to adjust engine operation to maintain engine speed below a maximum speed value. For example, the routine may adjust throttle position, spark timing, cam timing, fuel injection, or combinations thereof, to maintain engine speed below a maximum value to reduce any impact engine operation may have on other components due to potentially degraded damper operation. For example, the routine may set a desired speed value for a speed controller to the minimum speed value so that feedback control may be used via the throttle and or spark control to maintain engine speed below the maximum value if conditions arise where the speed may rise above the maximum value. The routine may also illuminate an indicator light to notify the vehicle operator of the potential damper issue, and may also set a diagnostic code indicating potential damper viscosity degradation.

In this way, it is possible to impose a lower engine speed limit until the damper viscosity and/or performance has been tested and passed the test, or, to decrease a maximum allowed engine speed limit when the damper viscosity and/or performance has degraded.

Figure 5:
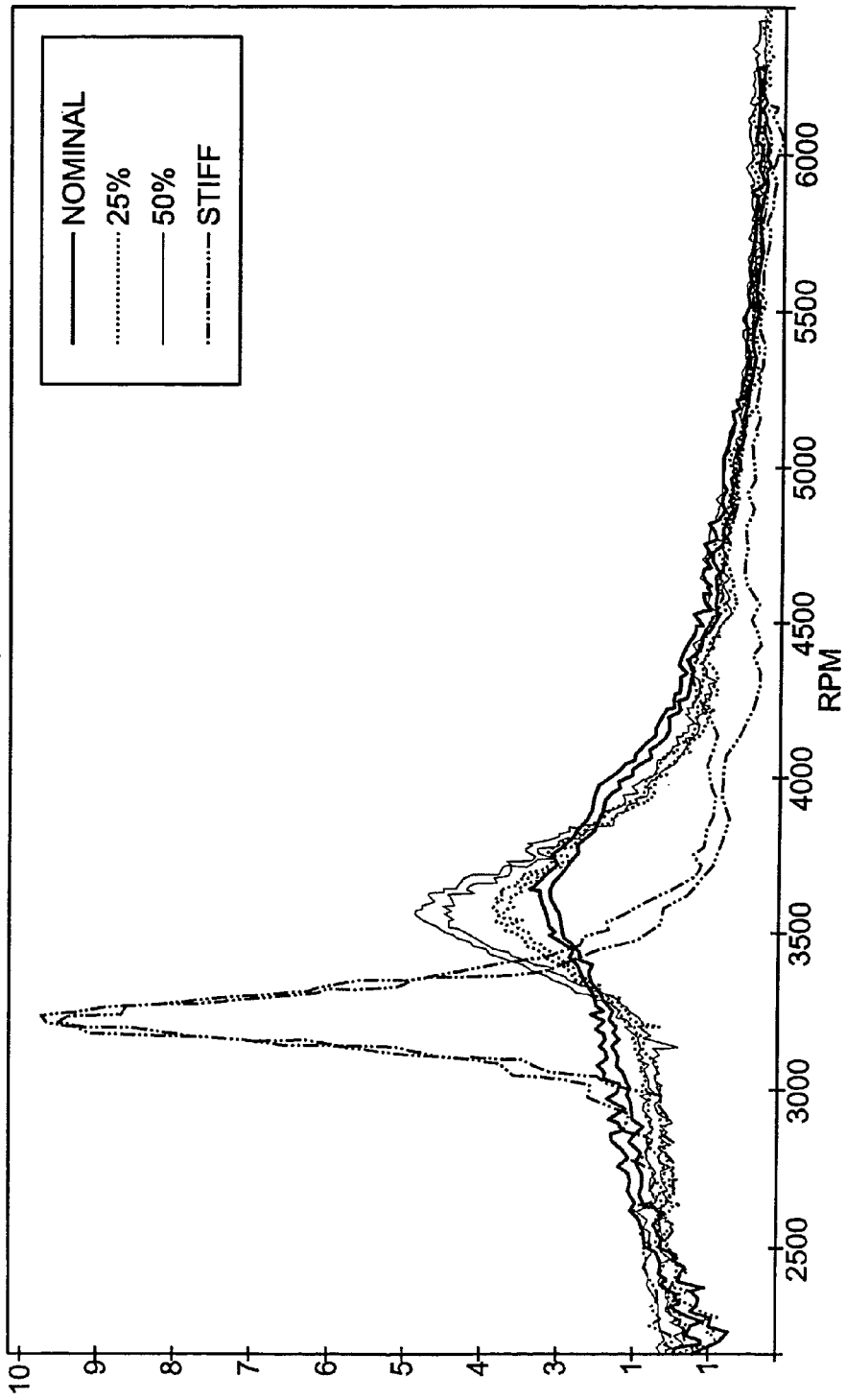
FIGS. 5-8 show example processed engine speed oscillation data.
Figure 6:
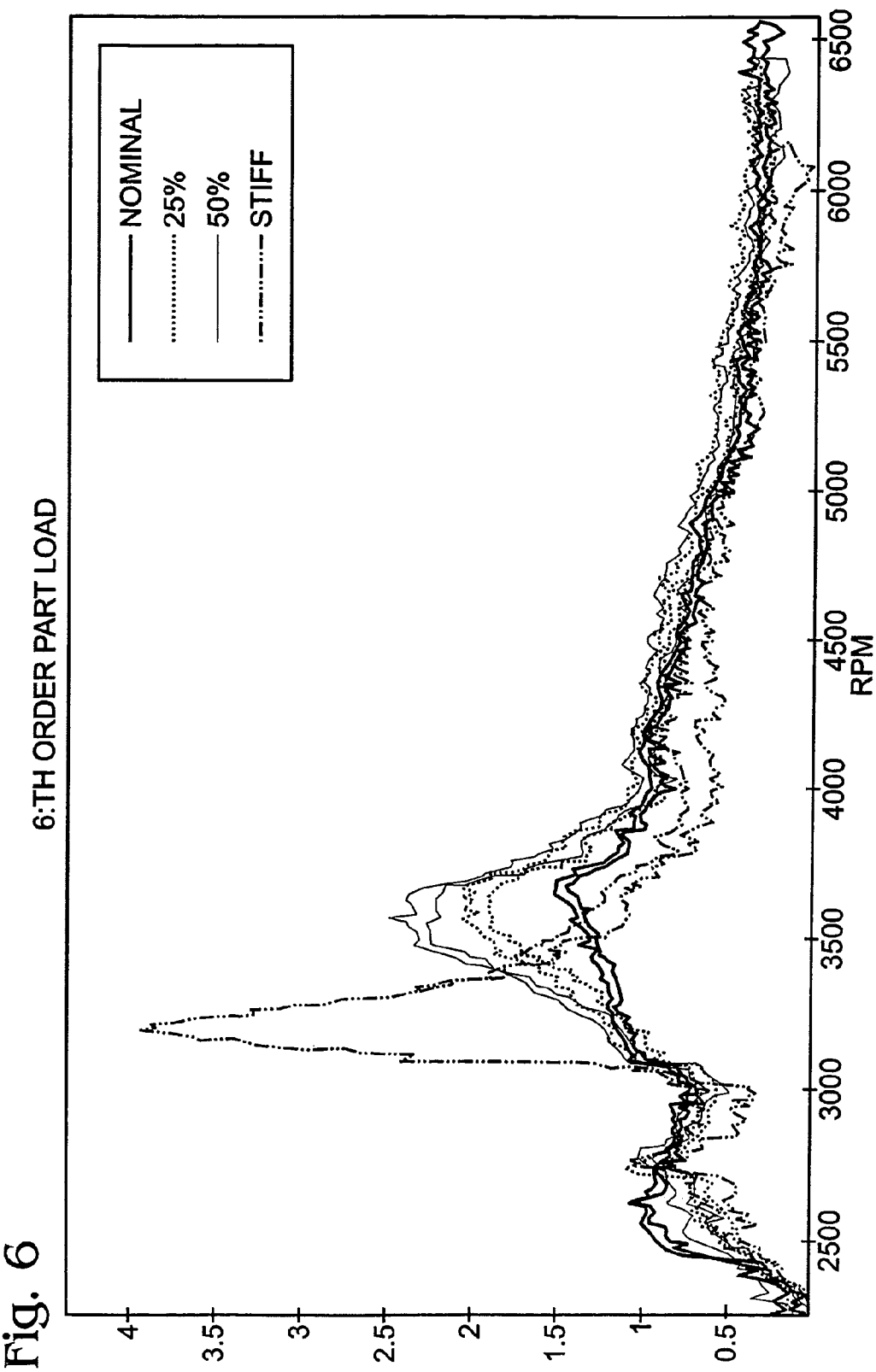
Figure 7:
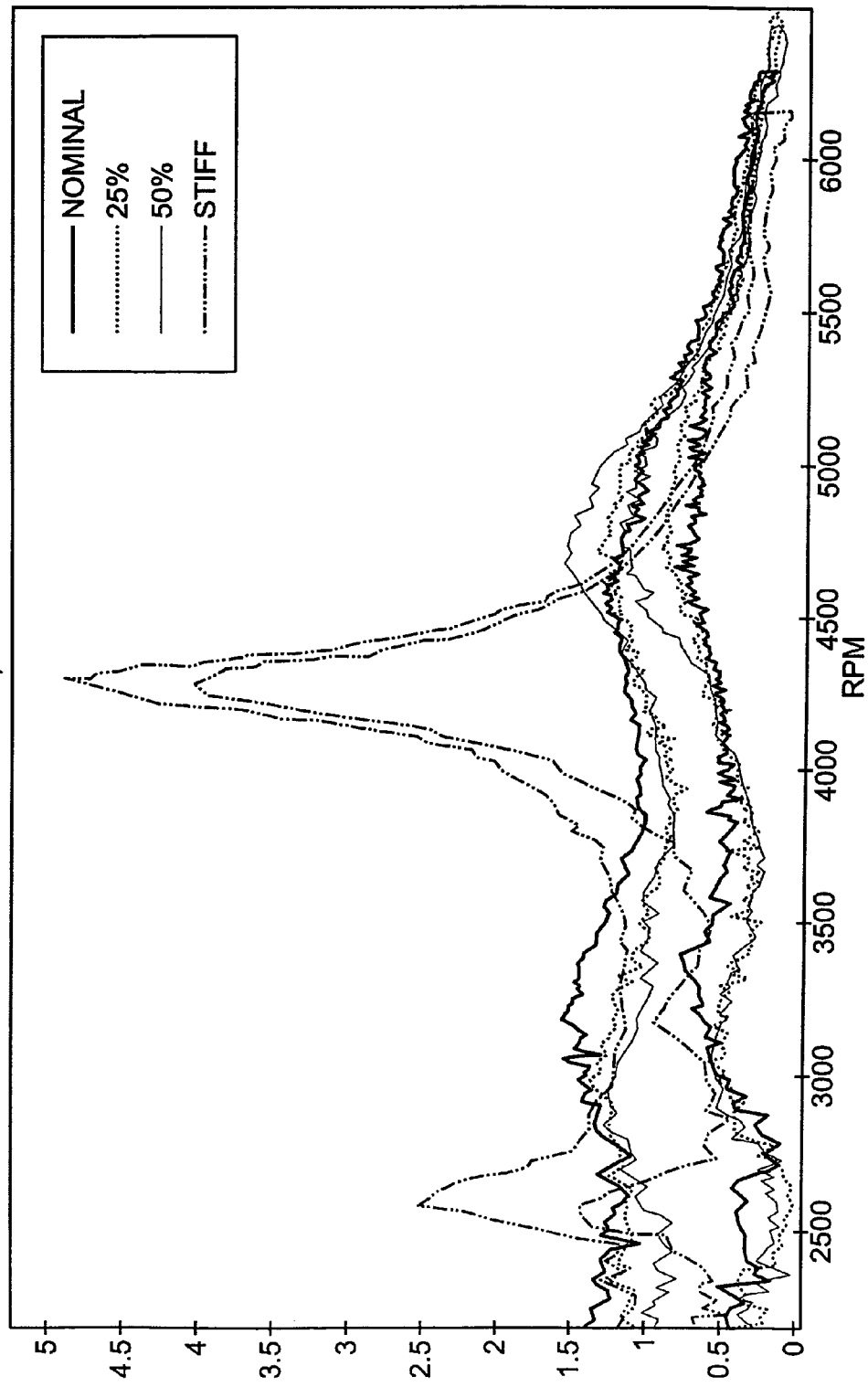
Figure 8:
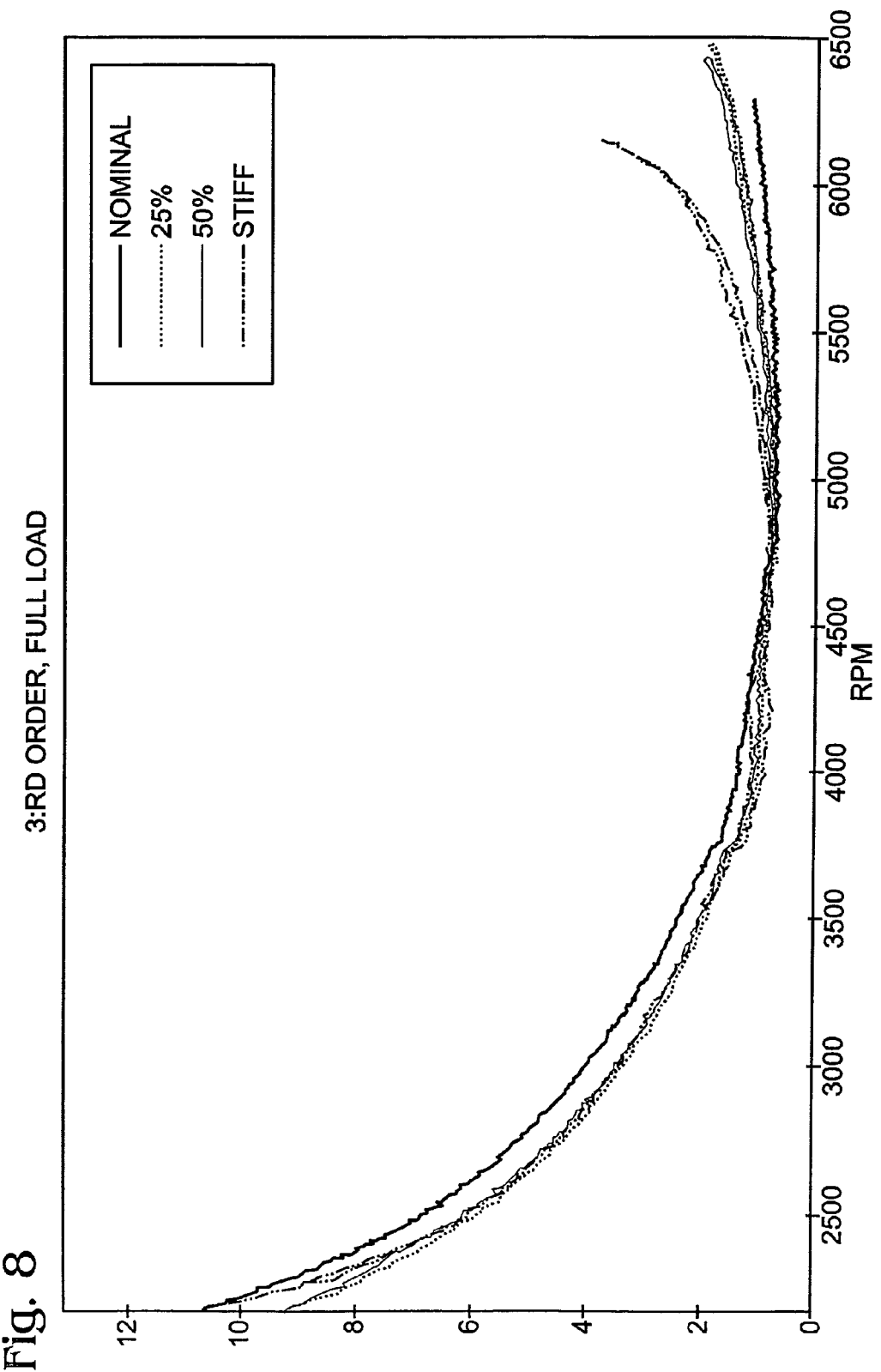

Referring now to FIGS. 5-8, various examples of engine vibration data processed with a discrete Fourier Transform (DFT) algorithm are shown. The data shows the results with different levels of viscosity reduction in the damper for different orders and/or engine loads. Each result is based (i.e. each point in the following diagrams) on a DFT over 60 samples (i.e. 5 engine revolutions). Specifically, FIG. 5 shows engine speed oscillations of a $6^{th}$ order harmonic across engine speeds at full (frequencies) for nominal viscosity, 25% damping remaining (150,000 cSt viscosity), 50% damping remaining (300,000 cSt viscosity), and a completely stiff (no damping) damper. As shown by FIG. 5, the amplitude increases (and the peak frequency shifts slightly) as the damping is reduced. Similar data is shown in FIG. 6 which shows part load responses. FIG. 7 shows data for a 4.5 order at full load, while FIG. 8 shows data for a $3^{rd}$ order at full load.

It will be appreciated that the configurations and routines disclosed herein are exemplary in nature, and that these specific embodiments are not to be considered in a limiting sense because numerous variations are possible. The subject matter of the present disclosure includes all novel and nonobvious combinations and subcombinations of the various system and exhaust configurations, algorithms, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method for operating an internal combustion engine of a vehicle traveling on the road, the method comprising:
    damping engine vibration with a damper coupled to the engine; and
    when said damping is reduced, preventing engine speed from rising above a threshold value, during a first engine or transmission state, to reduce degradation of the engine that would otherwise occur, and permitting engine speed to rise above the threshold during a second engine or transmission state.

2. The method of claim 1 wherein said damping is reduced when an amplitude of vibration increases.

3. The method of claim 2 wherein said amplitude is an amplitude of a sixth order harmonic of engine firing frequency.

4. The method of claim 3 wherein a change in said amplitude is used to identify said reduction in damping.

5. The method of claim 4 wherein said a limit of said change is varied with engine operating parameters.

6. The method of claim 2 further comprising identifying said damping is reduced by measuring engine speed fluctuations.

7. The method of claim 6 wherein said measuring is performed under selected operation conditions.

8. The method of claim 1, wherein said transmission state is at least a gear ratio or a torque converter state and wherein said engine state is at least a misfire state, where the first and second states include engine and transmission states.

9. The method of claim 6 wherein said engine speed is processed using a discrete Fourier Transform.

10. The method of claim 1 wherein said damper is an internal viscous damper.

11. The method of claim 1 wherein said threshold value varies with engine operating conditions.

12. The method of claim 1 wherein said prevention is performed by adjusting a position of an electronically controlled throttle coupled to an intake manifold of the engine.

13. A system for an engine, comprising:
    an internal viscous damper coupled to a crankshaft at a front end of the engine, the damper having a fluid located therein having a viscosity selected to reduce engine speed oscillations; and
    a controller configured to maintain engine speed below a threshold value, at least under selected operating conditions based on a transmission state, when viscosity of a fluid in said damper is reduced, where said threshold value is reduced when said viscosity is reduced.

14. The system of claim 13 wherein said controller is further configured to adjust a throttle position of the engine to maintain engine speed below said threshold value, and wherein said selected operating conditions include at least an engine state, wherein said engine state is at least a misfire state.

15. The system of claim 14 wherein said reduction in viscosity is identified based on at least one of a frequency and amplitude of engine speed oscillations.

16. The system of claim 14 wherein said controller identifies said reduction in viscosity based on an increase in amplitude of engine speed oscillations at a selected speed range.

17. The system of claim 16 wherein said controller is further configured to perform discrete Fourier Transform of engine position data to identify said reduction in viscosity.

18. The system of claim 13 wherein engine is coupled to a transmission of a passenger vehicle traveling on a road.

19. The system of claim 13 wherein said controller is further configured to set a diagnostic code when viscosity of a fluid in said damper is reduced.

20. A method for operating an internal combustion engine of a vehicle traveling on the road, the method comprising:
    damping engine vibration with a damper coupled to the engine;
    when said damping is reduced, maintaining engine speed below a threshold value, at least under selected operating conditions based on a transmission state, to reduce degradation of the engine that would otherwise occur; and
    setting a diagnostic code indicating degradation of said damper.

* * * * *